United States Patent
Kitamura et al.

(10) Patent No.: US 7,764,338 B2
(45) Date of Patent: Jul. 27, 2010

(54) METHOD OF PRODUCING POLARIZING PLATE WITH OPTICAL COMPENSATION LAYER AND IMAGE DISPLAY APPARATUS USING POLARIZING PLATE WITH OPTICAL COMPENSATION LAYER

(75) Inventors: Yoshitsugu Kitamura, Osaka (JP); Hiroyuki Okada, Osaka (JP)

(73) Assignee: Nitto Denko Corporation, Ibaraki-Shi, Osaka (JP)

(*) Notice: Subject to any disclaimer, the term of this patent is extended or adjusted under 35 U.S.C. 154(b) by 181 days.

(21) Appl. No.: 12/063,167

(22) PCT Filed: Dec. 21, 2006

(86) PCT No.: PCT/JP2006/325461
§ 371 (c)(1),
(2), (4) Date: Feb. 7, 2008

(87) PCT Pub. No.: WO2007/091377
PCT Pub. Date: Aug. 16, 2007

(65) Prior Publication Data
US 2009/0257017 A1    Oct. 15, 2009

(30) Foreign Application Priority Data
Feb. 9, 2006    (JP) ................. 2006-032049

(51) Int. Cl.
G02F 1/1335    (2006.01)
G02F 1/13    (2006.01)
(52) U.S. Cl. .......... 349/96; 349/105; 349/117; 349/118; 349/119; 349/120; 349/121; 349/122; 349/194
(58) Field of Classification Search ......... 349/117–122, 349/96–105, 194, 88–90, 115
See application file for complete search history.

(56) References Cited

U.S. PATENT DOCUMENTS

| 5,599,478 | A | * | 2/1997 | Matumoto et al. ...... 252/299.01 |
| 6,970,214 | B2 | | 11/2005 | Sato et al. |
| 7,084,944 | B2 | * | 8/2006 | Ito et al. ................ 349/117 |
| 7,235,283 | B2 | | 6/2007 | Adachi et al. |

(Continued)

FOREIGN PATENT DOCUMENTS

CN    1623108 A    6/2005

(Continued)

OTHER PUBLICATIONS

International Search Report of PCT/JP2006/325361, date of mailing Apr. 10, 2007.

*Primary Examiner*—Hoan C Nguyen
(74) *Attorney, Agent, or Firm*—Westerman, Hattori, Daniels & Adrian, LLP

(57) ABSTRACT

There are provided a method of producing a polarizing plate with an optical compensation layer having excellent adhesiveness between a polarizer-protective film and a polarizer without deterioration of the optical compensation layer. The method of producing a polarizing plate with an optical compensation layer includes: laminating an optical compensation layer on one side of a polarizer-protective film via a photo-curing adhesive layer; irradiating UV light toward the other side of the polarizer-protective film by a metal halide lamp or an ultrahigh pressure mercury lamp; and laminating a polarizer on the side of the polarizer-protective film on which the optical compensation layer is not formed.

6 Claims, 1 Drawing Sheet

U.S. PATENT DOCUMENTS

| | | |
|---|---|---|
| 7,270,855 B2 | 9/2007 | Yamaoka et al. |
| 2003/0090619 A1* | 5/2003 | Kumagai et al. ............ 349/194 |
| 2005/0074564 A1 | 4/2005 | Yamaoka et al. |
| 2005/0122586 A1 | 6/2005 | Junichi et al. |
| 2005/0157225 A1* | 7/2005 | Toyooka et al. ............... 349/99 |
| 2006/0108050 A1* | 5/2006 | Satake et al. ................ 156/101 |
| 2006/0192913 A1 | 8/2006 | Shutou et al. |
| 2009/0180059 A1* | 7/2009 | Fukuda et al. ................ 349/96 |

FOREIGN PATENT DOCUMENTS

| | | |
|---|---|---|
| JP | 7-113993 A | 5/1995 |
| JP | 2000-266932 A | 9/2000 |
| JP | 2002-303722 A | 10/2002 |
| JP | 2003-287622 A | 10/2003 |
| JP | 2003-322720 A | 11/2003 |
| JP | 2005-139401 A | 6/2005 |
| KR | 1020040083081 A | 9/2004 |
| KR | 10-2005-0001402 A | 1/2005 |
| KR | 10-2005-0084525 A | 8/2005 |

* cited by examiner

METHOD OF PRODUCING POLARIZING PLATE WITH OPTICAL COMPENSATION LAYER AND IMAGE DISPLAY APPARATUS USING POLARIZING PLATE WITH OPTICAL COMPENSATION LAYER

TECHNICAL FIELD

The present invention relates to a method of producing a polarizing plate with an optical compensation layer, a polarizing plate with an optical compensation layer obtained by such a method, and an image display apparatus using the polarizing plate with the optical compensation layer. More specifically, the present invention relates to a method of producing a polarizing plate with an optical compensation layer having excellent adhesiveness between a polarizer-protective film and a polarizer without causing deterioration of the optical compensation layer, a polarizing plate with an optical compensation layer obtained by such a method, and an image display apparatus using the polarizing plate with the optical compensation layer.

BACKGROUND ART

In various kinds of image display apparatuses including a liquid crystal display and an electroluminescence (EL) display, various kinds of polarizing plates with optical compression layers, which are combinations of polarizers and optical compensation layers are generally employed for optical compensation.

The optical compensation layer may be formed on one side of a polarizer-protective film in advance when the polarizing plate with the optical compensation layer is produced. For instance, there is a method in which a mixture solution of a bifunctional liquid crystal monomer and a bifunctional chiral agent is applied on a polarizer-protective film and then cholesterically aligned, followed by curing with irradiation of UV light to fix the cholesteric alignment (see Patent Document 1). Here, some of optical compensation layers may cause deterioration in optical, chemical, and mechanical characteristics of the optical compensation layer when UV light is irradiated from the side of the optical compensation layer. On the other hand, when the UV light irradiation is performed via the polarizer-protective film, there is a problem that the adhesiveness between the polarizer-protective film and the polarizer is inferior. Further, deterioration in adhesiveness between the polarizer-protective film and the polarizer may lead to deterioration in display characteristics of the image display apparatus.

Patent Document 1: JP 2003-287622 A

DISCLOSURE OF THE INVENTION

Problems to be Solved by the Invention

The present invention has been carried out for solving the above conventional problems, and an object thereof is to provide a method of producing a polarizing plate with an optical compensation layer having excellent adhesiveness between a polarizer-protective film and a polarizer without deterioration of the optical compensation layer.

Means for Solving the Problems

According to one aspect of the invention, a method of producing a polarizing plate with an optical compensation layer is provided. The method of producing a polarizing plate with an optical compensation layer includes: laminating an optical compensation layer on one side of a polarizer-protective film via a photo-curing adhesive layer; irradiating UV light toward the other side of the polarizer-protective film by a metal halide lamp or an ultrahigh pressure mercury lamp; and laminating a polarizer on the side of the polarizer-protective film on which the optical compensation layer is not formed.

In one embodiment of the invention, the optical compensation layer is formed by fixing an aligned state of a liquid crystal material.

According to another aspect of the invention, a polarizing plate with an optical compensation layer is provided. The polarizing plate with an optical compensation layer is produced by the method of producing a polarizing plate with an optical compensation layer.

According to still another aspect of the invention, an image display apparatus is provided. The image display apparatus includes the polarizing plate with an optical compensation layer.

Effects of the Invention

As described above, according to the present invention, UV light is irradiated using the aforementioned optical source from the side of the polarizer-protective film where no optical compensation layer is formed, so adhesiveness between the polarizer-protective film and the polarizer can be improved without deterioration of the optical compensation layer. As a result, an image display apparatus having good display characteristics can be provided.

DESCRIPTION OF SYMBOLS

Figure 1:
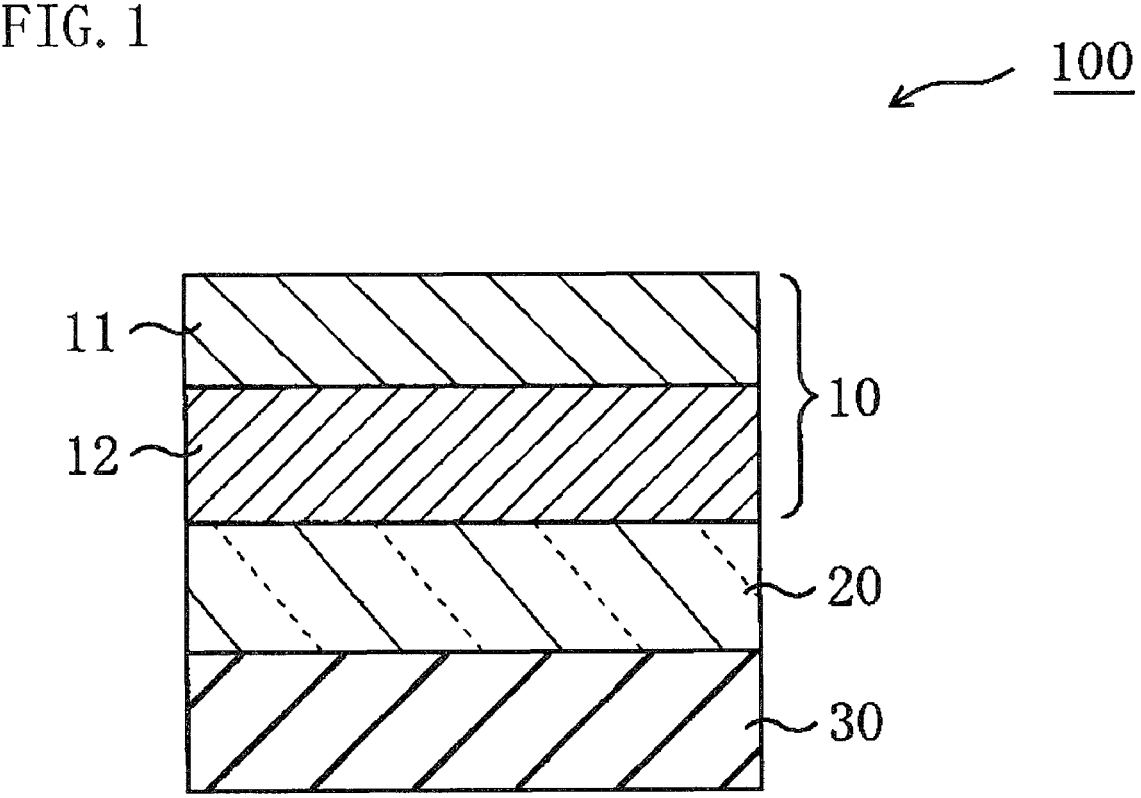
FIG. 1 is a schematic cross-sectional view of a polarizing plate with an optical compensation layer in accordance with a preferred embodiment of the present invention.

10 polarizing plate
11 polarizer
12 polarizer-protective film
20 photo-curing adhesive layer
30 optical compensation layer
100 polarizing plate with optical compensation layer

BEST MODE FOR CARRYING OUT THE INVENTION

Hereinafter, preferred embodiments of the present invention will be described. However, the present invention is not limited to these embodiments.

A. Whole Configuration of Polarizing Plate with Optical Compensation Layer

FIG. 1 is a schematic cross sectional view of a polarizing plate with an optical compensation layer in accordance with a preferred embodiment of the present invention. A polarizing plate with an optical compensation layer 100 includes a polarizing plate 10, a photo-curing adhesive layer 20, and an optical compensation layer 30 in this order. The polarizing plate 10 includes at least a polarizer 11 and a polarizer-protective film 12. The polarizer-protective film 12 is placed on a side of the polarizer 11 facing the optical compensation layer 30.

A-1. Polarizer

Any suitable polarizers may be employed as the polarizer 11 depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 5 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

A-2. Polarizer-protective Film

The polarizer-protective film 12 is produced using any of suitable films. Specific examples of a material constituting the film include transparent resins such as a cellulose-based resin such as triacetylcellulose (TAC), a polyester resin, a polyvinyl alcohol resin, a polycarbonate resin, a polyamide resin, a polyimide resin, a polyether sulfone resin, a polysulfone resin, a polystyrene resin, a polynorbornene resin, a polyolefin resin, an acrylic resin and an acetate resin. A further example thereof includes thermosetting resin such as acrylic-based, urethane-based, acrylic urethane-based, epoxy-based and silicone-based or UV-curing resin. In addition, the example thereof includes glassy polymer such as siloxane polymer. Further, a polymer film formed from a resin composition described in JP 2001-343529 A (WO 01/37007) may be used as a polarizer-protective, for example. More specifically, the film is formed from a mixture of a thermoplastic resin having a substituted imide group or unsubstituted imide group on a side chain, and a thermoplastic resin having a substituted phenyl group or unsubstituted phenyl group and a cyano group on a side chain. A specific example thereof includes a resin composition containing an alternate copolymer of isobutene and N-methylene maleimide, and an acrylonitrile/styrene copolymer. An extruded product of such a resin composition may be used, for example. Of those, TAC, the polyimide resin, the polyvinyl alcohol resin and the glassy polymer are preferred. TAC is more preferred.

The polarizer-protective film is preferably transparent and has no color. More specifically, the polarizer-protective film has a thickness direction retardation Rth of preferably −90 nm to +90 nm, more preferably −80 nm to +80 nm, and most preferably −70 nm to +70 nm.

A thickness of the polarizer-protective film may be set appropriately as long as the above thickness direction retardation is obtained. A thickness of the polarizer-protective film is preferably 5 mm or less, more preferably 1 mm or less, particularly preferably 1 to 500 μm, and most preferably 5 to 150 μm.

Practically, any suitable protecting film can be formed on the side of the polarizer 11 where no compensation layer 30 is formed. The protecting film may be a film of the same kind as that of the polarizer-protective film as described above.

A-3. Photo-curing Adhesive Layer

A photo-curing adhesive that forms the above photo-curing adhesive layer 20 contains monomers and/or polymers which can be cured by photo-irradiation, and a photopolymerization initiator. In the present invention, the "monomers" include monomers and oligomers.

The monomers which can be cured by photo-irradiation include acryl-, epoxy-, urethane-, ester-, silicone-, amide-, allylate-, sulfone-, imide-, ether sulfone-, ether imide-, carbonate-, fluorine-, olefine-, styrene-, vinyl pyrrolidone-, cellulose-, and acrylonitrile-based monomers. When the monomers are in the form of an oligomer, the molecular weight of the oligomer may be 3,000 to 20,000.

The polymers which can be cured by photo-irradiation include polyfunctional polymers having photoreactive functional groups, for example. Specifically, the polymers include homo polymers or copolymers which can be obtained by polymerization of the above monomers, or polymers having photoreactive functional groups added to the side chains thereof. The molecular weight of the polymer can be 20,000 to 100,000.

The above photopolymerization initiator is not specifically limited as far as it can be activated by light to initiate the reaction of a photo-curing component. Specific examples of the photopolymerization initiator include acetophenone-, benzoin ether-, benzophenone-, xanthone-, thioxanthone-, amine-, benzyl ketal-, and acyloxime ester-based photopolymerization initiators.

The content of the photopolymerization initiator is preferably 0.1 to 20 parts by weight, more preferably 1 to 10 parts by weight with respect to total 100 parts by weight of the above monomers and polymers.

The photo-curing adhesive can contain any appropriate additive. Examples of the additives include a filler, an adhesion-imparting agent, a photoreaction-accelerator, an antiaging agent, and a surfactant.

A-4. Optical Compensation Layer

The configuration of the above optical compensation layer 30 may be of a mono layer or may be a laminate with two or more layers. The optical compensation layer may be a film (including a stretched film) or a coating layer.

The optical compensation layer can be produced using any of appropriate materials having desired optical characteristics. Specific examples of the above film include a norbornene-based film, a polycarbonate-based film, and a cellulose-based film. The material which forms the above coating layer may be a non-liquid crystal material or a liquid crystal material. Examples of the non-liquid crystal material include polyamide, polyimide, polyester, polyether ketone, polyamideimide, and polyesterimide. Examples of the liquid crystal material include a liquid crystal composition containing a nematic liquid crystal and a chiral agent and a liquid crystal composition containing a discotic liquid crystal.

The optical compensation layer is preferably a layer produced by fixing the aligned state of the liquid crystal material. Examples of the layer produced by fixing the aligned state of the liquid crystal material include a nematic liquid crystal layer with fixed alignment as disclosed in JP 8-220504 A and a discotic liquid crystal layer as disclosed in JP 2005-275104 A. The optical compensation layer may be a layer formed by fixing the aligned state of the liquid crystal monomer as disclosed in [0035] to [0046] of JP 2003-287623 A. In this case, the optical compensation layer becomes the so-called positive A plate with a refractive index profile represented by nx>ny=nz. Further, the optical compensation layer may be a layer (the so-called alignment-fixed cholesteric layer) produced by properly mixing the liquid crystal monomer as disclosed in [0035] to [0046] of JP2003-287623 A with a chiral agent as disclosed in [0048] to [0055] thereof and fixing the aligned state of the liquid crystal monomer. In this case, the optical compensation layer becomes the so-called negative C plate with a refractive index profile represented by nx=ny>nz. The contents of these disclosures are incorporated herein by reference.

B. Method of Producing Polarizing Plate with Optical Compensation Layer

A method of producing a polarizing plate with an optical compensation layer in accordance with one embodiment of the present invention includes: laminating an optical compensation layer on one side of a polarizer-protective film via a photo-curing adhesive layer; irradiating UV light by a metal halide lamp or an ultrahigh pressure mercury lamp from the other side of the polarizer-protective film; and laminating a polarizer on the side of the polarizer-protective film on which the optical compensation layer is not formed.

B-1. Lamination of Polarizer-protective Film and Optical Compensation Layer

The polarizer-protective film and the optical compensation layer are laminated via the photo-curing adhesive layer. At first, on one side of the polarizer-protective film, the photo-curing adhesive layer is formed. The photo-curing adhesive layer can be formed by applying the above photo-curing adhesive onto one side of the polarizer-protective film. The thickness of the photo-curing adhesive layer is, but not specifically limited to, preferably 10 μm or less, more preferably 0.05 to 5 μm, most preferably 0.1 to 3 μm.

When the optical compensation layer is a film, the film is attached to the surface of the photo-curing adhesive layer. For the case in which the compensation layer is a coating layer, an alignment-fixed cholesteric layer will be described as an example thereof.

A typical method of forming an alignment-fixed cholesteric layer includes forming a spread layer by spreading the liquid crystal composition on the substrate; treating the spread layer with heat so that a liquid crystal material in the liquid crystal composition is cholesterically aligned; and fixing the alignment of the liquid crystal material by carrying out at least one of a polymerization treatment and a cross-linking treatment of the spread layer.

Specifically, the liquid crystal composition containing the liquid crystal material (preferably a polymerizable liquid crystal material or a cross-linking liquid crystal material) and a chiral agent is dissolved or dispersed in a solvent to prepare a liquid crystal-application liquid having a desired viscosity. Next, the liquid crystal-application liquid is applied onto a substrate, thereby forming a spread layer. As a method of forming a spread layer, any of suitable methods (typically a method of flowing to spread the application liquid) can be employed. Specific examples of such a method include a roll coating method, a spin coating method, a wire bar coating method, a dip coating method, an extrusion coating method, a curtain coating method, a spray coating method, a die coating method, a slit coating method, a slide coating method, and a micro gravure coating method. Among them, from a view point of application efficiency, a spin coating method and an extrusion coating method are preferred. An applying amount of the liquid crystal-application liquid can be suitably defined according to the concentration of the application liquid and the intended thickness of a layer. The substrate can be any of appropriate substrates that allow the above liquid crystal material to be aligned. Typically, the substrate may be any of various plastic films.

Next, the above spread layer is treated with heat so that the above liquid crystal material can be aligned in a state of representing a liquid crystal phase. The above spread layer contains a chiral agent together with the above liquid crystal material. Thus, the above liquid crystal material is aligned by being provided with a twist in a state of representing the liquid crystal phase. As a result, the spread layer (the liquid crystal material that constitutes the spread layer) represents a cholesteric structure (helical structure). The temperature condition of the thermal treatment can be suitably defined according to the kind of the above liquid crystal material (specifically, temperature at which the liquid crystal material shows liquid crystal phase).

Preferably, a polymerizable liquid crystal material or a cross-linking liquid crystal material is used as the above liquid crystal material. While the liquid crystal material is kept in a state of representing a cholesteric structure, the alignment of the liquid crystal material (cholesteric structure) is fixed by subjecting the spread layer to polymerization treatment or cross-linking treatment. The specific procedure of the polymerization or cross-linking treatment can be suitably selected depending on the kind of the polymerization initiator or cross-linking agent to be used. For instance, when a photo-polymerization initiator or a photo-cross-linking agent is used, photo-irradiation can be carried out. When a UV-polymerization initiator or a UV-cross-linking agent is used, UV light irradiation can be carried out. In addition, when a thermal polymerization initiator or a thermal cross-linking agent is used, heating can be carried out. The irradiation time, irradiation intensity, total irradiation quantity or the like of light or UV light can be suitably defined depending on the kind of the liquid crystal material, the kind of the substrate, the desired characteristics of the optical compensation layer, and so on. Similarly, the heating temperature, heating time, or the like can be suitably defined depending on the purpose.

The alignment-fixed cholesteric layer thus formed on the substrate is transferred to the surface of the photo-curing adhesive layer, thereby becoming an optical compensation layer. The transfer further includes peeling off the substrate from the optical compensation layer.

B-2. UV Light Irradiation

UV light is irradiated by a metal halide lamp or an ultrahigh pressure mercury lamp from the other side of the polarizer-protective film (i.e., the side thereof on which the optical compensation layer is not formed). The UV light irradiation with such an optical source can prevent the generation of ozone from the surface of the above polarizer-protective film. As a result, the effects of ozone leading to the formation of a weak layer on the surface of the polarizer-protective film can be prevented, while providing good adhesiveness between the polarizer-protective film and the polarizer. The metal halide lamp is a lamp having, for example, a luminescence length (irradiating distance) of 125 to 1,450 mm and an input power of 100 W to 24 kW. An arc tube used in the metal halide lamp is made of, for example, silica glass. Mercury, inert gas such as rare gas, and metal halide can be enclosed in the arc tube. Examples of metal halide include iodinated metals such as sodium iodide, thallium iodide, indium iodide, scandium iodide, tin iodide, and dysprosium iodide; and brominated metals such as tin bromide. Among them, the iodinated metal is preferred. The ultrahigh pressure mercury lamp is a lamp having, for example, a luminescence length (irradiating distance) of 10 to 150 mm and an input power of 500 W to 5 kW. The mercury-vapor pressure during the operation of the ultrahigh pressure mercury lamp is typically 50 to 200 atm. The arc tube used in the ultrahigh pressure mercury lamp is made of, for example, silica glass. Mercury and rare gas can be enclosed in the arc tube.

The total irradiation quantity of UV light is 200 to 1,000 mJ/cm$^2$, more preferably 400 to 700 mJ/cm$^2$, still more preferably 500 to 600 mJ/cm$^2$. The "total irradiation quantity" used herein means the integrated amount of light in a wavelength range of 320 to 390 nm. With the total irradiation quantity of UV light in the above range, the above photo-curing adhesive layer can be effectively cured while the generation of ozone can be more effectively prevented.

B-3. Lamination of Polarizer-protective Film and Polarizer

For the lamination of a polarizer-protective film and a polarizer, any of suitable lamination methods (for example, adhesion) can be adopted. The adhesion can be carried out using any of suitable adhesives or pressure-sensitive adhesives. The type of the adhesive or pressure-sensitive adhesive can be properly selected depending on the types of adherends (i.e., the polarizer-protective film and the polarizer). Specific examples of the adhesive include polymer-based adhesives such as acrylic-, vinyl alcohol-, silicone-, polyester-, polyurethane-, and polyether-based adhesives; isocyanate-based adhesives and rubber-based adhesives. Specific examples of the pressure-sensitive adhesive include acrylic-, vinyl alcohol-, silicone-, polyester-, polyurethane-, polyether, isocyanate-, and rubber-based pressure-sensitive adhesives.

The thickness of the above adhesive or pressure-sensitive adhesives is, but not specifically limited to, preferably 0.01 to 0.2 µm, more preferably 0.03 to 0.18 µm, most preferably 0.05 to 0.15 µm.

It goes without saying that the polarizing plate with the optical compensation layer produced by the producing method of the present invention can be applied to any of image display apparatuses that require polarizing plates. Specific examples of the image display apparatus include a liquid crystal display or spontaneous luminescence display apparatuses such as an electroluminescence (EL) display, a plasma display (PD) and a field emission display (FED).

Hereinafter, the present invention will be specifically described with reference to examples. However, the present invention will be not limited to any of these examples.

EXAMPLE 1

(Production of Polarizer)

A polyvinyl alcohol film (manufactured by Kuraray Co., Ltd., trade name: VF-PS) was stretched by 2.7 times while being immersed in pure water at 30° C. for 1 minute. Then, the film was stretched by 1.4 times while being immersed in an aqueous solution with an iodide concentration of 3% by weight at 30° C. for 1 minute. Subsequently, the film was stretched by 1.7 times while being immersed in an aqueous mixture solution with a boric acid concentration of 4% by weight and an iodide concentration of 3% by weight at 55° C. for 2 minutes. The stretched film was dipped in an aqueous solution with an iodide concentration of 3.4% by weight at 30° C. for 5 seconds. After that, the film was dried in air (27° C.) for 7 minutes, thereby obtaining a polarizer.

A protecting film (triacetyl cellulose film, manufactured by Fuji Photo Film Co., Ltd., trade name: Fuji TAC) is laminated on one side of the polarizer obtained as described above via a polyvinyl alcohol-based adhesive (0.1 µm in thickness).

(Production of Optical Compensation Layer)

A liquid crystal-application liquid was prepared by uniformly mixing 90 parts by weight of a nematic liquid crystal-based compound represented by formula (1) described below, 10 parts by weight of a chiral agent represented by formula (2) described below, 5 parts by weight of a photopolymerization initiator (IRGACURE 907, manufactured by Ciba Specialty Chemicals, Co., Ltd.), and 300 parts by weight of methylethyl ketone. The liquid crystal-application liquid was applied on a substrate (PET film, thickness: about 75 µm) by a spin coating method and the remaining solvent was then removed by heating at 80° C. for 3 minutes. Subsequently, an optical compensation layer constructed of a chiral nematic (cholesteric) liquid crystal layer and having 2 µm thick was formed by polymerization with irradiation of UV light (20 mJ/cm$^2$, 365 nm in wavelength). Note that the resulting optical compensation layer has an in-plane retardation (Re) of 0 nm and a thickness direction retardation (Rth) of 110 nm.

[Chem 1]

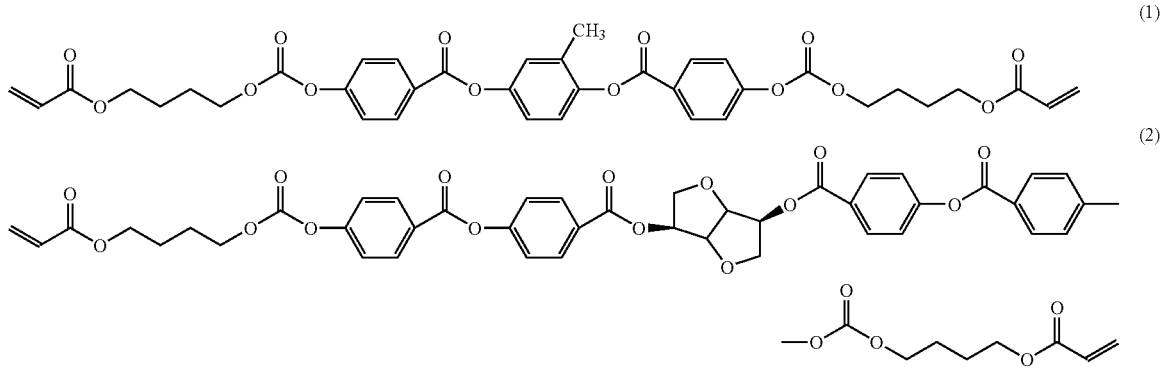

(1)

(2)

(Production of Polarizing Plate with Optical Compensation Layer)

A photo-curing adhesive layer with a thickness of 2 µm was formed by applying a photo-curing adhesive (manufactured by Nippon Synthetic Chemical Industry Co., Ltd., trade name: SIKO UV-6100B) on one side of a polarizer-protective film (triacetyl cellulose film manufactured by Fuji Photo Film Co., Ltd., trade name: Fuji TAC). The optical compensation layer formed on the above substrate was attached to the surface of the photo-curing adhesive layer. In this case, the optical compensation layer was attached so as to face the photo-curing adhesive layer. Subsequently, UV light was irradiated toward the side of the polarizer-protective film on which the optical compensation layer is not formed, at a total irradiation quantity of 500 mJ/cm² using a metal halide lamp (manufactured by Ushio Inc., trade name: UVL-3200M2-N). Subsequently, the substrate was peeled off from the optical compensation layer.

The above polarizer laminated with the protecting film was attached to the side of the polarizer-protective film on which the optical compensation layer is not formed, via a polyvinyl alcohol-based adhesive (0.1 µm in thickness). In this case, the polarizer is attached so as to face the polarizer-protective film. Consequently, the polarizing plate with the optical compensation layer was obtained.

EXAMPLE 2

A polarizing plate with an optical compensation layer was produced in a manner similar to Example 1, except that UV light irradiation was carried out at a total irradiation quantity of 400 mJ/cm².

EXAMPLE 3

A polarizing plate with an optical compensation layer was produced in a manner similar to Example 1, except that UV light irradiation was carried out at a total irradiation quantity of 700 mJ/cm².

EXAMPLE 4

A polarizing plate with an optical compensation layer was produced in a manner similar to Example 1, except that UV light irradiation was carried out at a total irradiation quantity of 800 mJ/cm².

EXAMPLE 5

A polarizing plate with an optical compensation layer was produced in a manner similar to Example 1, except that UV light irradiation was carried out at a total irradiation quantity of 500 mJ/cm² using an ultrahigh pressure mercury lamp (manufactured by Ushio Inc., trade name: USH-350DP) instead of the metal halide lamp.

EXAMPLE 6

A polarizing plate with an optical compensation layer was produced in a manner similar to Example 1, except that UV light irradiation was carried out at a total irradiation quantity of 400 mJ/cm² using an ultrahigh pressure mercury lamp (manufactured by Ushio Inc., trade name: USH-350DP) instead of the metal halide lamp.

EXAMPLE 7

A polarizing plate with an optical compensation layer was produced in a manner similar to Example 1, except that UV light irradiation was carried out at a total irradiation quantity of 700 mJ/cm² using an ultrahigh pressure mercury lamp (manufactured by Ushio Inc., trade name: USH-350DP) instead of the metal halide lamp.

EXAMPLE 8

A polarizing plate with an optical compensation layer was produced in a manner similar to Example 1, except that UV light irradiation was carried out at a total irradiation quantity of 800 mJ/cm² using an ultrahigh pressure mercury lamp (manufactured by Ushio Inc., trade name: USH-350DP) instead of the metal halide lamp.

COMPARATIVE EXAMPLE 1

A polarizing plate with an optical compensation layer was produced in a manner similar to Example 1, except that UV light irradiation was carried out at a total irradiation quantity of 500 mJ/cm² using a high-pressure mercury lamp (manufactured by Ushio Inc., trade name: UVL-3200-0) instead of the metal halide lamp.

COMPARATIVE EXAMPLE 2

A polarizing plate with an optical compensation layer was produced in a manner similar to Example 1, except that UV light irradiation was carried out at a total irradiation quantity of 250 mJ/cm² using a high-pressure mercury lamp (manufactured by Ushio Inc., trade name: UVL-3200-0) instead of the metal halide lamp.

COMPARATIVE EXAMPLE 3

A polarizing plate with an optical compensation layer was produced in a manner similar to Example 1, except that UV light irradiation was carried out at a total irradiation quantity of 300 mJ/cm² using a high-pressure mercury lamp (manufactured by Ushio Inc., trade name: UVL-3200-0) instead of the metal halide lamp.

COMPARATIVE EXAMPLE 4

A polarizing plate with an optical compensation layer was produced in a manner similar to Example 1, except that UV light irradiation was carried out at a total irradiation quantity of 350 mJ/cm² using a high-pressure mercury lamp (manufactured by Ushio Inc., trade name: UVL-3200-0) instead of the metal halide lamp.

COMPARATIVE EXAMPLE 5

A polarizing plate with an optical compensation layer was produced in a manner similar to Example 1, except that UV light irradiation was carried out at a total irradiation quantity of 400 mJ/cm² using a high-pressure mercury lamp (manufactured by Ushio Inc., trade name: UVL-3200-0) instead of the metal halide lamp.

Methods of determining the characteristics of the examples and the comparative examples are as follows:

(1) Measurement of Retardation

The refractive indexes nx, ny, and nz of the optical compensation layer were measured using an automatic birefringence measuring device (manufactured by Oji Scientific Instruments, Co., Ltd., automatic optical birefringence analyzer KOBRA21-ADH) and then an in-plane retardation (Re) and a thickness direction retardation (Rth) were calculated. The measurement temperature was 23° C. and the measurement wavelength was 590 nm.

(2) Measurement of Total Irradiation Quantity

A UV light illuminometer (manufactured by ORC Manufacturing, Co., Ltd., trade name: UV-M02) was placed on the UV light-irradiated surface of the polarizer-protective film to measure illuminance in a wavelength region of 320 to 390 nm. The total irradiation quantity was calculated by multiplying the measured value by the irradiation time (sec).

(3) Evaluation of Adhesiveness

The cutting edge of a cutter was inserted between the polarizer and polarizer-protective film on the end of the polarizing plate with the optical compensation layer as described above. At the inserted portion, the polarizer and the polarizer-protective film were independently grasped and pulled in opposite directions. In this case, adhesiveness was judged good when the polarizer and/or the polarizer-protective film were/was broken and not able to be separated. On the other hand, when the polarizer and the polarizer-protective film were partially or completely separated, adhesiveness was judged poor.

In each of Examples 1 to 3 and Examples 5 to 7, the adhesiveness between the polarizer-protective film and the polarizer was good. In each of Example 4 and Example 8, comparing with Examples 1 to 3 and Examples 5 to 7, though slight separation was found around the above cutter-inserted portion, the adhesiveness was good. On the other hand, in Comparative Example 2 and Comparative Example 3, separation was partially observed between the polarizer-protective film and the polarizer. In each of Comparative Examples 1, 4, and 5, the polarizer-protective film and the polarizer were completely separated.

INDUSTRIAL APPLICABILITY

A method of producing a polarizing plate with an optical compensation can be preferably applied to the production of a liquid crystal television, a cellular phone, and so on.

The invention claimed is:

1. A method of producing a polarizing plate with an optical compensation layer, comprising in the stated order:
    laminating an optical compensation layer on one side of a polarizer-protective film via a photo-curing adhesive layer;
    irradiating UV light toward the other side of the polarizer-protective film by a metal halide lamp or an ultrahigh pressure mercury lamp; and
    laminating a polarizer on the side of the polarizer-protective film on which the optical compensation layer is not formed.

2. A method of producing a polarizing plate with an optical compensation layer according to claim 1, wherein
    the optical compensation layer is formed by fixing an aligned state of a liquid crystal material.

3. A polarizing plate with an optical compensation layer, comprising in the stated order:
    an optical compensation layer laminated on one side of a polarizer-protective film via a photo-curing adhesive layer, wherein the photo-curing adhesive layer is cured by UV light irradiated toward the other side of the polarizer-protective film by a metal halide lamp or an ultrahigh pressure mercury lamp; and
    a polarizer laminated on the side of the polarizer-protective film on which the optical compensation layer is not formed.

4. The polarizing plate with an optical compensation layer of claim 3, wherein the optical compensation layer is formed by fixing an aligned state of a liquid crystal material.

5. An image display apparatus, comprising a polarizing plate with an optical compensation layer comprising in the stated order:
    an optical compensation layer laminated on one side of a polarizer-protective film via a photo-curing adhesive layer, wherein the photo-curing adhesive layer is cured by UV light irradiated toward the other side of the polarizer-protective film by a metal halide lamp or an ultrahigh pressure mercury lamp; and
    a polarizer laminated on the side of the polarizer-protective film on which the optical compensation layer is not formed.

6. The image display apparatus according to claim 5, wherein the optical compensation layer is formed by fixing an aligned state of a liquid crystal material.

* * * * *